United States Patent
Sherman et al.

(10) Patent No.: US 11,216,706 B2
(45) Date of Patent: Jan. 4, 2022

(54) SYSTEM AND METHOD FOR VISUALLY PRESENTING INTERESTING PLOTS OF TABULAR DATA

(71) Applicant: Datorama Technologies Ltd., Tel Aviv-Jaffa (IL)

(72) Inventors: Uri Sherman, Tel-Aviv (IL); Roee David, Tel-Aviv (IL)

(73) Assignee: Datorama Technologies Ltd., Tel-Aviv (IL)

( * ) Notice: Subject to any disclaimer, the term of this patent is extended or adjusted under 35 U.S.C. 154(b) by 349 days.

(21) Appl. No.: 16/353,714

(22) Filed: Mar. 14, 2019

(65) Prior Publication Data

US 2019/0286949 A1    Sep. 19, 2019

Related U.S. Application Data

(60) Provisional application No. 62/643,462, filed on Mar. 15, 2018.

(51) Int. Cl.
| | |
|---|---|
| *G06K 9/62* | (2006.01) |
| *G06T 11/20* | (2006.01) |
| *G06F 16/22* | (2019.01) |
| *G06F 40/18* | (2020.01) |
| *G06F 40/177* | (2020.01) |

(52) U.S. Cl.
CPC ......... *G06K 9/6293* (2013.01); *G06F 16/221* (2019.01); *G06F 40/177* (2020.01); *G06F 40/18* (2020.01); *G06T 11/20* (2013.01)

(58) Field of Classification Search
None
See application file for complete search history.

(56) References Cited

U.S. PATENT DOCUMENTS

| | | | | |
|---|---|---|---|---|
| 10,523,682 | B1* | 12/2019 | Badawy | H04L 41/16 |
| 2006/0195782 | A1* | 8/2006 | Wang | G06F 16/9577 |
| | | | | 715/205 |
| 2014/0201129 | A1* | 7/2014 | Gupta | G06F 16/278 |
| | | | | 707/602 |
| 2015/0170056 | A1* | 6/2015 | Breckenridge | G06K 9/6227 |
| | | | | 706/12 |
| 2016/0055205 | A1* | 2/2016 | Jonathan | G06F 16/9024 |
| | | | | 707/714 |
| 2017/0063881 | A1* | 3/2017 | Doganata | H04L 63/1416 |
| 2018/0088753 | A1* | 3/2018 | Viegas | G06F 16/2282 |

* cited by examiner

*Primary Examiner* — Howard Cortes

(57) ABSTRACT

A system and method for generating visual representations of interesting plots of tabular data. The method includes determining a plurality of prediction values for a plurality of column sets included in tabular data, wherein each column set includes at least one of the plurality of columns, wherein each prediction value is determined for a column set of the plurality of column sets using a prediction function selected from a plurality of prediction functions based on a column type of each column of the column set; determining an interest rank for each column of the plurality of columns based on the plurality of prediction values; determining an interest rank for each plot of a plurality of potential plots based on the plurality of prediction values and the interest rank of each of the plurality of columns, wherein each potential plot is a plot of one of the plurality of column sets; and generating a visual representation of at least one interesting plot, wherein the at least one interesting plot is selected from among the plurality of potential plots based on the plurality of interest ranks.

17 Claims, 4 Drawing Sheets

SYSTEM AND METHOD FOR VISUALLY PRESENTING INTERESTING PLOTS OF TABULAR DATA

CROSS-REFERENCE TO RELATED APPLICATIONS

This application claims the benefit of U.S. Provisional Application No. 62/643,462 filed on Mar. 15, 2018, the contents of which are hereby incorporated by reference.

TECHNICAL FIELD

The present disclosure relates generally to a system and method for automatically generating a dashboard based on an input data file.

BACKGROUND

As marketers are being held accountable to drive business growth, prioritize budget efficiency and cultivate an exceptional customer experience simultaneously, it is essential to leverage data to operationalize these mandates. Such data is often presented visually.

Some solutions for presenting data visually require manual creation of plots and graphs for dashboards. Specifically, a user selects data that appears interesting (e.g., data illustrating unusual or otherwise desirable results) and creates plots, graphs, or both, to be included in a dashboard. Selecting which data is interesting may include reviewing values of the data to identify interesting values and/or creating preliminary plots and graphs before deciding which plots and graphs are visually intriguing.

Manually creating plots and graphs for dashboards based on data can be tedious and time consuming. Further, such manual evaluation of data is inherently subjective and, as a result, leads to inconsistent results when determining which data is interesting and should therefore be included in the presentation of the data. In particular, whether data is interesting may vary based on, for example, the degree to which data is unusual, whether the data supports a particular conclusion of the person selecting the interesting data, and the like.

Other existing solutions allow for automatically creating plots and graphs. However, these solutions typically cannot accurately identify plots that will be interesting.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for generating visual representations of interesting plots of tabular data. The method comprises: determining a plurality of prediction values for a plurality of column sets included in tabular data, wherein each column set includes at least one of the plurality of columns, wherein each prediction value is determined for a column set of the plurality of column sets using a prediction function selected from a plurality of prediction functions based on a column type of each column of the column set; determining an interest rank for each column of the plurality of columns based on the plurality of prediction values; determining an interest rank for each plot of a plurality of potential plots based on the plurality of prediction values and the interest rank of each of the plurality of columns, wherein each potential plot is a plot of one of the plurality of column sets; and generating a visual representation of at least one interesting plot, wherein the at least one interesting plot is selected from among the plurality of potential plots based on the plurality of interest ranks.

Certain embodiments disclosed herein also include a non-transitory computer readable medium having stored thereon causing a processing circuitry to execute a process, the process comprising: determining a plurality of prediction values for a plurality of column sets included in tabular data, wherein each column set includes at least one of the plurality of columns, wherein each prediction value is determined for a column set of the plurality of column sets using a prediction function selected from a plurality of prediction functions based on a column type of each column of the column set; determining an interest rank for each column of the plurality of columns based on the plurality of prediction values; determining an interest rank for each plot of a plurality of potential plots based on the plurality of prediction values and the interest rank of each of the plurality of columns, wherein each potential plot is a plot of one of the plurality of column sets; and generating a visual representation of at least one interesting plot, wherein the at least one interesting plot is selected from among the plurality of potential plots based on the plurality of interest ranks.

Certain embodiments disclosed herein also include a system for generating visual representations of interesting plots of tabular data. The system comprises: a processing circuitry; and a memory, the memory containing instructions that, when executed by the processing circuitry, configure the system to: determine a plurality of prediction values for a plurality of column sets included in tabular data, wherein each column set includes at least one of the plurality of columns, wherein each prediction value is determined for a column set of the plurality of column sets using a prediction function selected from a plurality of prediction functions based on a column type of each column of the column set; determine an interest rank for each column of the plurality of columns based on the plurality of prediction values; determine an interest rank for each plot of a plurality of potential plots based on the plurality of prediction values and the interest rank of each of the plurality of columns, wherein each potential plot is a plot of one of the plurality of column sets; and generate a visual representation of at least one interesting plot, wherein the at least one interesting plot is selected from among the plurality of potential plots based on the plurality of interest ranks.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
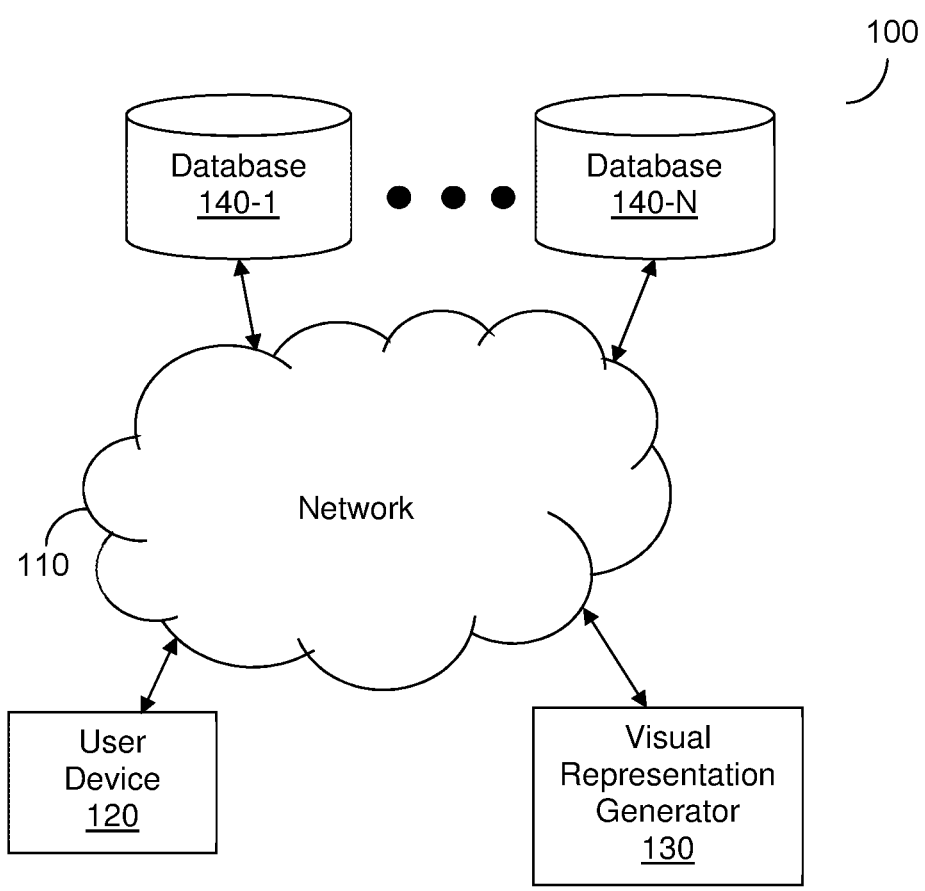
FIG. 1 is a network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for creating a dashboard that provides a fast overview or exploration of tabular data. In some implementations, the disclosed embodiments may be used to create dashboards for cross-document tabular data. Given such tabular data, visual representations of interesting plots are generated using interest heuristics. The visual representations may be used to create a dashboard showing the interesting plots.

In an embodiment, input tabular data is received or retrieved. A number of columns present in the tabular data is determined. Relationships among the columns are identified. The relationships are represented by prediction values determined using a prediction function, where each prediction value indicates a degree to which one column predicts another. Determining values for the prediction function further includes determining a type of each column using a model trained via machine learning. An interest rank is determined for each column. Based on the column interest ranks and the determined values of the prediction function, an interest rank is determined for each plot of two of the columns.

A visual representation of at least a portion of the input tabular data is generated based on the plot interest ranks. To this end, interesting plots having the highest interest ranks (e.g., the top X ranked plots or plots having an interest rank above a threshold) may be selected for visual representation. The visual representations may include the plots, graphs visually illustrating plot data, both, and the like. A dashboard including the visual representations is created. The dashboard may be sent for display.

As a non-limiting example, the visual representations may include plots of marketing campaign data. The marketing campaign data may be stored as tabular data featuring columns such as a measurement column indicating numbers of post-click conversions for an advertisement and a dimension column indicating geographical locations in which the advertisement was served. An interesting plot may feature the geographical locations column as a first column and the post-click conversions column as a second column such that the plot demonstrates the effect of geographical location on numbers of post-click conversions.

Various disclosed embodiments include using machine learning to aid in determining the relationships between the columns. More specifically, the disclosed embodiments include use of machine learning to determine column types which, in turn, is utilized to select an appropriate prediction function to be applied to tabular data. To this end, such embodiments include training a machine learning model as a classifier to classify columns into types. Such types include, but are not limited to, dimension columns and measurement columns. Features used to train the classifier may include column names, column distributions, column values as strings, and relations to other columns. Accordingly, the classifier outputs a column type, which in turn may be utilized to select the prediction function.

The disclosed embodiments provide an automated data selection and dashboard creation process that objectively determines interesting data among tabular data for inclusion in dashboards. To this end, the disclosed embodiments provide techniques for analyzing tabular data based on relationships among columns of the tabular data in order to create plots and metrics that accurately reflect these relationships. Additionally, the disclosed embodiments allow creation of dashboards for documents which have unknown sources and for documents which have complex structures. The dashboards may be updated continuously, periodically, or otherwise as new tabular data is received. The disclosed embodiments also provide techniques that may be applied to tabular data of different documents in order to recognize interconnections between documents.

FIG. 1 shows an example network diagram 100 utilized to describe the various disclosed embodiments. In the example network diagram 100, a user device 120, a visual representation generator 130, and a plurality of databases 140-1 through 140-N (hereinafter referred to individually as a database 140 and collectively as databases 140, merely for simplicity purposes) communicate via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The user device (UD) 120 may be, but is not limited to, a personal computer, a laptop, a tablet computer, a smartphone, a wearable computing device, or any other device capable of receiving visual data and displaying dashboards. The databases 140 store tabular data such as, but not limited to, data included in a comma separated value (CSV) document, spreadsheet document, or data otherwise organized using tables.

The visual representation generator 130 is configured to identify interesting plots based on tabular data and to generate visual representations of the interesting plots as described further herein. To this end, the visual representation generator 130 may be configured to retrieve tabular data from the databases 140, to receive the tabular data from the user device 120, or both. The tabular data may be data from a single document (e.g., data from a single spreadsheet file) or may be data in a database created using multiple input sources (e.g., data from multiple spreadsheet files).

As an example, a CSV document is received with 12 columns. It is not known what these columns are, but output plots of the data are desired. In an example implementation in which each plot is based on two columns, there are $$\binom{12}{2} = 66$$

possible plots to choose from. A reasonable number of plots in the dashboard may be, as a non-limiting example, at most 15 of the 66 possible plots. Given the CSV document, the visual representation generator 130 is configured to provide the user of the user device 120 with summary and insights regarding the data in the form of visual representations of plots.

Given a document with |C| columns, the number of possible plots is greater than $$\binom{|C|}{2} = \Theta(|C^2|).$$

As the number of columns increases, so does the number of possible plots. Accordingly, as the amount of data increases, selecting meaningful plots becomes impractical to perform manually. Further, even when such selection is performed manually, a high degree of subjectivity is interjected by the selector. A database can be thought as a list of documents that may intersect on their columns. This implies that, typically, |C| will be getting larger and new tools are needed to recognize the interconnections between documents in our data base.

In an embodiment, the visual representation generator 130 is configured to identify the interesting plots in the tabular data by applying prediction functions to calculate prediction values for sets of columns and determining an interest rank for each plot of a column set based on the prediction values. Each column set includes one or more columns. The highest ranked sets of columns (e.g., plots having an interest rank above a threshold or the top X ranked sets, where X is an integer having a value of one or greater).

A discussion of determining interest rankings for plots follows. For purposes of this discussion, C is a list of columns, i.e., $C=\{c_1, c_2, \ldots, c_n\}$, where $c_n$ is a column and n is an integer having a value greater than or equal to 2. The list of columns does not need to be in a particular order and may or may not include all columns in the tabular data.

A prediction value is calculated for each column set. The prediction value represents a degree to which other columns predict a first column. Accordingly, higher prediction values represent a higher degree to which other columns predict the first column.

The sets may include inverse column sets where the order of the columns is reversed. As a non-limiting example, the sets of columns may include the set $(c_1, c_2)$ as well as the set $(c_2, c_1)$ such that the prediction function values include one value representing the degree to which $c_2$ predicts $c_1$ and one value representing the degree to which $c_1$ predicts $c_2$. For sets with more than two columns, the sets may include different orders of three or more columns. Thus, all potential plots may be considered.

In an embodiment, the prediction function applied for each column set depends on the type of each column of the set. In a further embodiment, the types include measurement columns and dimension columns. Measurement columns include any column containing numerical values such that mathematical operations may reasonably be applied thereto. Dimension columns may include columns including any other data. Distinguishing between measurement and dimension columns allows aids in determining relationships between columns. In particular, the prediction function applied to the columns may be selected based on the type of each column.

Example prediction functions follow. For the following examples, $W(c_1, c_2)$ is a prediction function for a first column $c_1$ and a second column $c_2$. The prediction function $W(c_1, c_2)$ quantifies a degree to which the first column $c_1$ predicts the second column $c_2$.

If $c_1$ is a dimension column and $c_2$ is a measurement column, then the prediction function is:

$$W(c_1, c_2) = 1 - \frac{\mathbb{E}(\text{Var}(c_2 \mid c_1))}{\text{Var}(c_2)} \quad \text{Equation 1}$$

Here, $\mathbb{E}(\text{Var}(c_2|c_1))$ is the conditional variance of $c_2$ on $c_1$ known as the unexplained variance of $c_2$ by $c_1$. Hence, $$\frac{\mathbb{E}(\text{Var}(C_2 \mid c_1))}{\text{Var}(c_2)}$$

is the normalized unexplained variance. Note also that $W(c_1, c_1)$ is equivalent to the coefficient of determination.

If $c_1$ is a measurement column and $c_2$ is a dimension column, then the prediction function is:

$$W(c_1, c_2) = 0 \quad \text{Equation 2}$$

Alternatively, if $c_1$ is a measurement column and $c_2$ is a dimension column, the prediction function may be implemented by defining the change in frequency of values of $c_2$, for example, using Kullback-Leibler divergence. Further, if there is only a single corresponding value of $c_2$ for any given value of $c_1$, the range of values for $c_1$ may be divided into percentiles. As a non-limiting example, this may be performed when $c_1$ includes revenue values and $c_2$ includes organization types.

If both $c_1$ and $c_2$ are dimension columns, then the prediction function is:

$$W(c_1, c_2) = 1 - \frac{H(c_2 \mid c_1)}{H(c_2)} \quad \text{Equation 3}$$

Here, $H(c_2)$ is the entropy of $c_2$ and $H(c_2|c_1)$ is the conditional entropy of $c_2$ over $c_1$. This can be conceptualized as the "normalized explained entropy."

If both $c_1$ and $c_2$ are measurement columns, then the prediction function is:

$$W(c_1, c_2) = |\rho(c_1 c_2)| \quad \text{Equation 4}$$

Here, $\rho$ is the Pearson coefficient.

In an example implementation, W may have any or all of the following properties.

First, W may be normalized such that its values are in the range of [0,1], changing the values of a dimension column while keeping any frequencies the same will not affect the value of W, and scaling the values of a measurement column by an amount other than zero will not affect the value of W. When the values of W are in the range of [0,1], values closer to 1 represent a higher degree to which $c_2$ predicts $c_1$.

Second, W may be an asymmetrical function such that at least some inverse column sets yield different prediction values. In other words, inverse column sets do not necessarily yield the same prediction values. Two inverse column sets each include the same two columns in reverse or otherwise different order. As a non-limiting example, $W(c_1, c_2)$ is not necessarily the same as its inverse $W(c_2, c_1)$. For example, the prediction value determined for each column set is not the same if one of the columns is a dimension column and the other is a measurement column or if both columns are dimension columns. If both columns are measurement columns, the prediction value may be the same.

In some implementations, an asymmetrical prediction function may improve the precision of the interest ranks and correctly ordering columns when determining interest. This is because often, in practice, if one thing affects another than the other is likely a consequence of the first. More specifically, the precision of the output may be improved by differentiating cause and effect and the plots may be ordered such that they are more meaningful (e.g., a plot of $c_1$, over $c_2$ may be more meaningful than the other way around).

In some implementations, more column types, more specific column types, or both, may be taken into account. This increases the precision of the function W. As a non-limiting example, ordinal columns may be dimension columns that have a clear order on the values in the columns. As another non-limiting example, date columns may be used only for printing plots and prediction values may only be calculated for sets of columns that do not include date columns. As yet another non-limiting example, aggregation columns may be measurement columns that include certain types of aggregated values determined based on values in other columns such as, but not limited to, sums, percentages, averages, and the like. Further, entity relationships between columns may be taken into account in order to plot or estimate results with high granularity.

In an embodiment, for each column $c \in C$, the visual representation generator 130 is configured to determine an interest rank $R(c)$ based on the prediction values. In an example implementation, $R(c)$ may be determined as the sum of the prediction values for other columns predicting a first column. For example, $R(c_1)$ may be calculated as $W(c_2, c_1)+W(c_3, c_1)+ \ldots +W(c_n, c_1)$. However, this rank may be inaccurate because it does not capture indirectly induced predictions. To this end, in an embodiment, determining $R(c)$ further comprises creating a prediction graph G based on the prediction values.

The prediction graph G is a weighted and directed graph having a vertex set that is the list of columns C and an edge set that is defined by the prediction function $W(c_1, c_2)$. The values of $R(c)$ are determined by running an algorithm such as a power iteration algorithm on the prediction graph G. The power iteration algorithm may be used to determine important columns (i.e., columns having high interest ranks), where the interest rank is higher as the number of other columns that predict a column well (e.g., having prediction values above a threshold) increases, when there are other columns that predict it well and are themselves important, or both.

In an embodiment, the visual representation generator 130 is configured to determine interest ranks for plots of the sets of columns based on the respective interest ranks of each column in each plot. In a further embodiment, an interest rank $R(c_1, c_2)$ is calculated as follows:

$$R(c_1,c_2)=R(c_1)R(c_2)W(c_1,c_2) \qquad \text{Equation 5}$$

When $R(c)$ and $W(c_1, c_2)$ have values in the range of [0,1], $R(c_1, c_2)$ will also have values in the range of [0,1]. Further, the functions have the property that in order for a plot to have a high value (i.e., close to 1) of the rank $R(c_1, c_2)$, the values of $R(c_1)$, $R(c_2)$, and $W(c_1, c_2)$ will all be relatively high (i.e., close to 1). Thus, when both columns are important with respect to interest rank and one column predicts the other well, the interest rank for the plot will be close to 1.

In another embodiment, different numbers of columns (i.e., other than 2) may be included in one or more of the column sets. For example, one or more column sets may include 1 or 3 columns each. The specific criteria used for selecting prediction functions and the group of prediction functions to be selected from may be different for different numbers of columns in a column set. Further, the resulting plot may differ depending on the number of columns in the column set used to create the plot.

As a non-limiting example for a 1-column set, the interest rank for the potential plot may be 0 when the column is a dimension column (i.e., not interesting) or may be equal to $R(c_1)$ calculated as described above. The resulting plot for an interesting 1-column set may be a status bar indicating a mean, sum, or other calculation result determined based on values in the column.

As a non-limiting example for a 3-column set, the interest rank $R(c_1, c_2, c_3)$ for the potential plot may be calculated as follows:

$$R(c_1,c_2,c_3)=R(c_1)R(c_2)R(c_3)W(c_1,c_2) \qquad \text{Equation 6}$$

Here, $R(c)$ and $W(c_1, c_2)$ are calculated as described above. The resulting plot for an interesting 3-column set may be a scatter plot with point sizes determined based on values of the third column $c_3$.

Figure 2A:
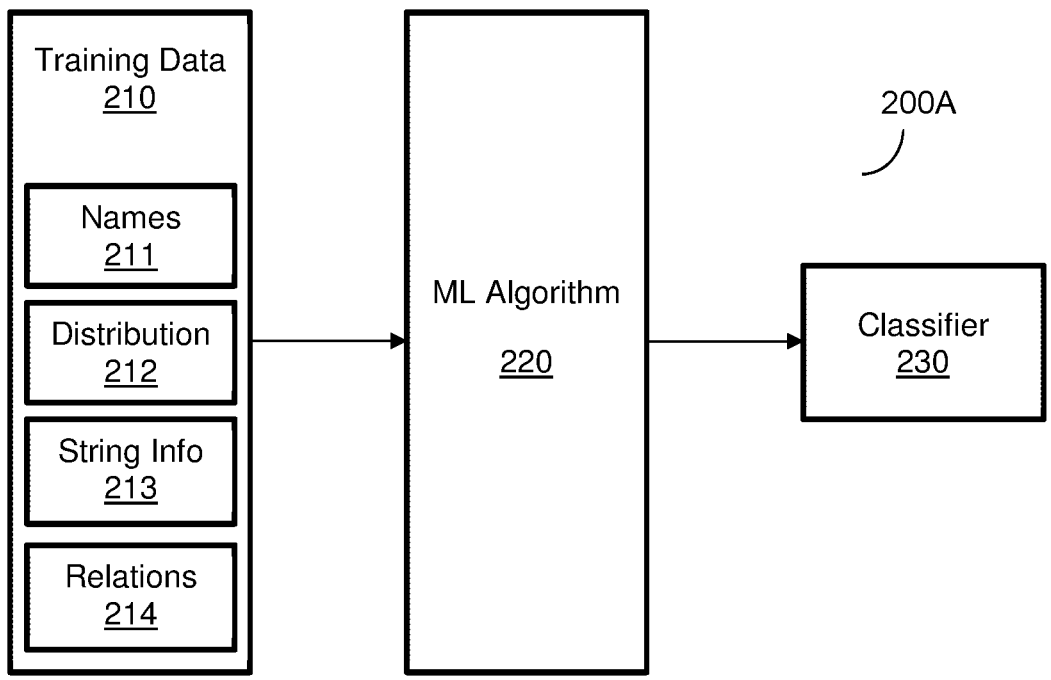
FIGS. 2A-B are flow diagrams illustrating training and applying a classifier to classify columns into column types according to an embodiment.
Figure 2B:
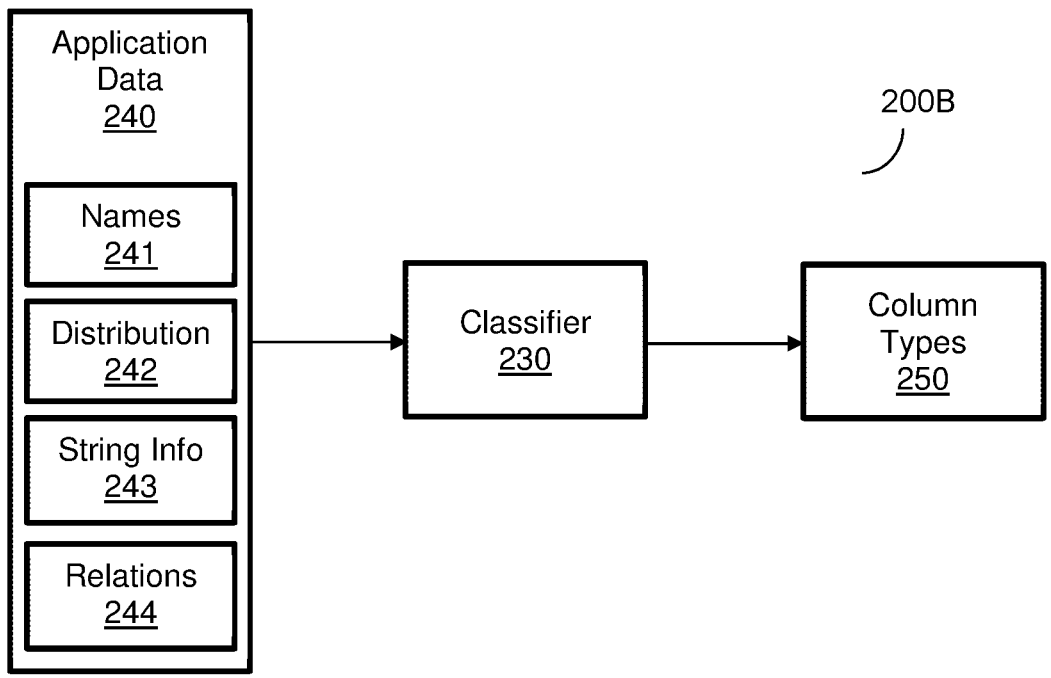

FIGS. 2A-2B are example flow diagrams 200A and 200B, respectively, showing training and application of a classifier for classifying columns of tabular data into column types according to an embodiment.

In FIG. 2A, training data 210 is input to a machine learning algorithm 220 to train a classifier 230. The training data 210 includes data to be used as inputs to the machine learning algorithm. Such data includes data related to columns, data included in the columns, and relationships among columns. Accordingly, this data may be utilized to classify alike data and, in particular, data of columns having the same column type.

In an example implementation, the training data 210 includes column names 211, column distribution features 212, string information (info) features 213, and relations 214. The column names 211 are textual descriptions of, for example contents of each column. The column distribution features 212 indicate characteristics of data distributed in each column such as, for example, the distance of each value from a normal, exponential, or uniform distribution. The string information features 213 indicate characteristics of the column data as strings such as, but not limited to, whether there is a decimal point, whether there is a leading zero, whether all values in the column have the same number of digits, and whether there are error-correcting codes applied to the columns. The relations 214 indicate how a column is related to other columns and may include, for example, whether other columns are correlated with the column, and whether other columns have a many-to-one relation with the column.

In FIG. 2B, application data 240 is fed to the classifier 230 in order to output column types 250. The application data includes features extracted from tabular data, such as column names 241, column distribution features 242, string information (info) features 243, and relations 244. In an embodiment, the column types 250 include measurement columns and dimension columns. In other implementations, more columns, more specific columns, or both, may be included in the column types 250. For example, such columns may include ordinal columns.

Figure 3:
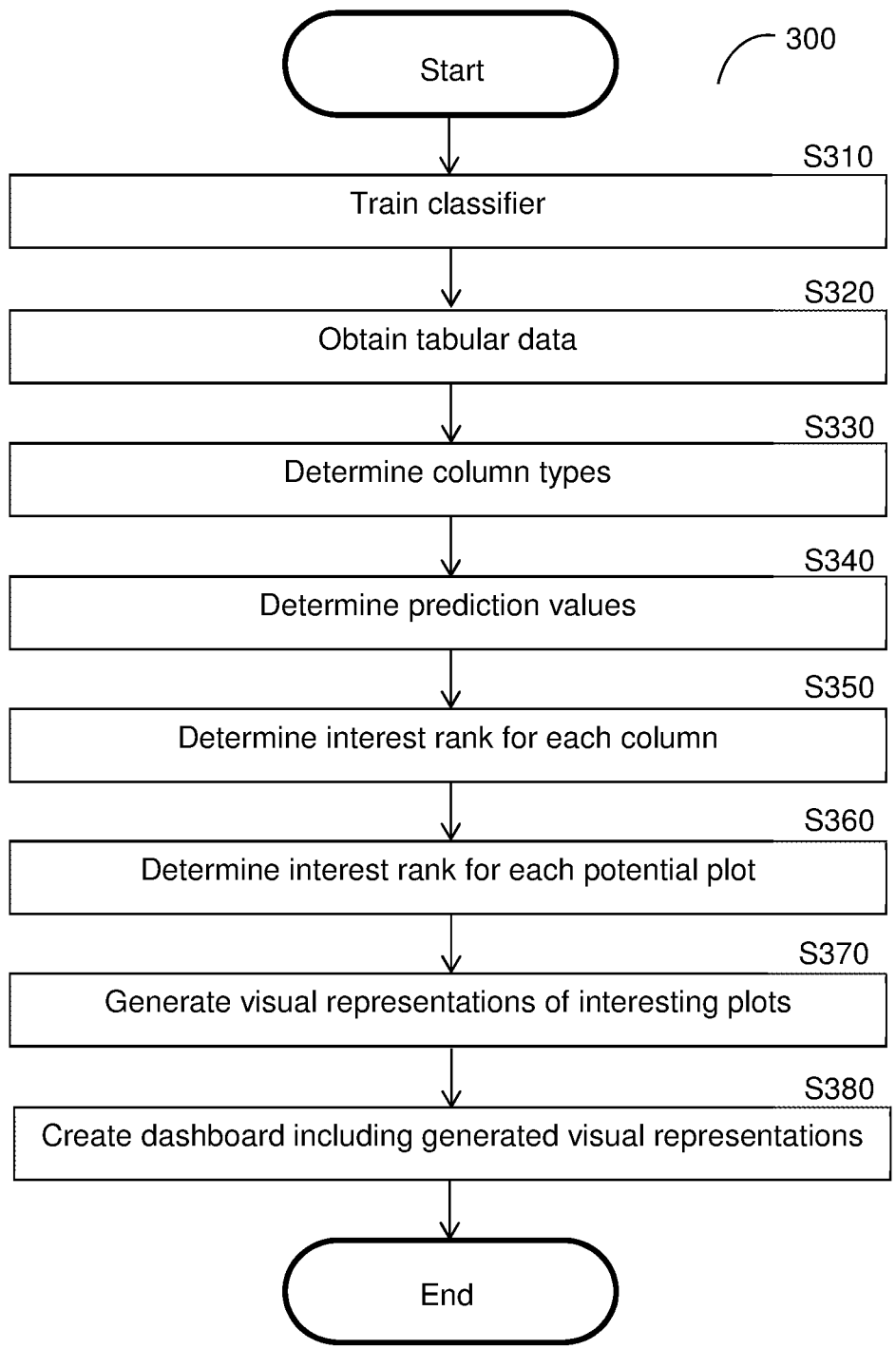
FIG. 3 is a flowchart illustrating a method for generating visual representations of interesting plots of tabular data according to an embodiment.

FIG. 3 is an example flowchart 300 illustrating a method for generating visual representations of interesting plots of tabular data according to an embodiment.

At optional S310, a classifier is trained. The classifier is trained to classify data included in columns into types. The classifier may be trained as described herein above with respect to FIG. 2A. The types include, but are not limited to, dimension columns and measurement columns. The classifier may be continuously refined as new tabular data is received.

At S320, tabular data is obtained. The tabular data may be received (e.g., from the user device 120, FIG. 1) or retrieved (e.g., from the data sources 140, FIG. 1).

At S330, column types are determined for columns in the tabular data. The column types may be predetermined (e.g., indicated explicitly in the data or determined based on user inputs) or may be determined using machine learning. To this end, in an embodiment, S330 includes extracting features from the tabular data and using the features as inputs to the classifier trained at S310. Determining the column types via machine learning may be performed as described herein above with respect to FIG. 2B.

At S340, prediction values are determined for sets of columns of the tabular data. In an embodiment, S340 includes applying a prediction function to determine a prediction value for each column set. Each column set includes one or more columns. In an example implementation, each column set includes a first column and a second column, and the prediction value determined for a column set indicates measures how well the first column predicts the second column. The sets of columns may further include sets of columns in reverse order, i.e., such that a prediction value is determined as a measure of how much a first column predicts a second column and as a measure of how much the second column predicts the first column. When the column sets include sets of more than 2 columns, the column sets having more than 2 columns may include different permutations of 3 or more columns.

In an embodiment, the prediction function to be applied for each column set depends on the type of each column (for a 2-column set, examples may include a measurement column and a dimension column, a dimension column and a measurement column, two measurement columns, or two dimension columns). Example prediction functions W to be applied to different sets of columns are described further herein above with respect to equations 1 through 4. To this end, in an embodiment, S340 includes selecting a prediction function to be applied for each column set based on the column type of each column of the column set.

At S350, an interest rank is determined for each column of the tabular data based on the prediction values. In an embodiment, S350 includes creating a prediction graph whose vertex set is a list of columns C and the edge set is defined by the prediction function $W(c_1, c_2)$.

At S360, an interest rank is determined for each potential plot of columns in the tabular data. Each potential plot is of a column set. In an embodiment, the interest rank for a potential plot is determined as the product of the interest rank of the first column by the interest rank of the second column by the prediction value of the second column with respect to the first column as shown in Equation 5 herein above. In some implementations, some potential plots may be excluded.

At S370, visual representations of interesting plots are generated. The visual representations may include, but are not limited to, tables, graphs, or other visual representations of the data included in the plotted columns. Interesting plots may include plots for column sets having interest ranks above a threshold or may include a number of plots having the highest interest ranks (e.g., the top 3 column sets having the 3 highest interest ranks). In an embodiment, the visual representations may be updated as new tabular data is added to the columns. For example, data may be periodically added to tables. New plots may be created for sets of columns determined as interesting based on the added new data.

At optional S380, a dashboard including the generated visual representations is created. The dashboard may be sent to, for example, a user device (e.g., the user device 120), for display. In some implementations (not shown), the dashboard may be updated as new data is received (e.g., continuously, periodically, or when the new data is received).

Figure 4:
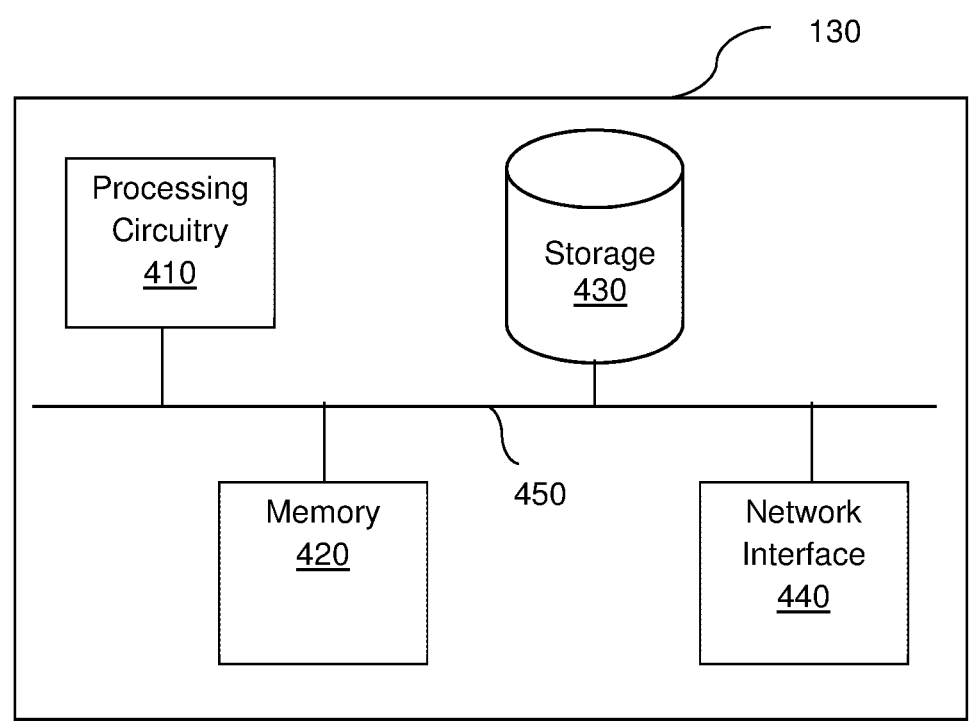
FIG. 4 is a schematic diagram of an automatic visual representation generator according to an embodiment.

FIG. 4 is an example schematic diagram of a visual representation generator 130 according to an embodiment. The visual representation generator 130 includes a processing circuitry 410 coupled to a memory 420, a storage 430, and a network interface 440. In an embodiment, the components of the visual representation generator 130 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 420 may be volatile (e.g., RAM, etc.), non-volatile (e.g., ROM, flash memory, etc.), or a combination thereof. In one configuration, computer readable instructions to implement one or more embodiments disclosed herein may be stored in the storage 430.

In another embodiment, the memory 420 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein. Specifically, the instructions, when executed, cause the processing circuitry 410 to generate fleet behavior models and detect anomalous behavior in fleets or sub-fleets as described herein.

The storage 430 may be magnetic storage, optical storage, and the like, and may be realized, for example, as flash memory or other memory technology, CD-ROM, Digital Versatile Disks (DVDs), or any other medium which can be used to store the desired information.

The network interface 440 allows the visual representation generator 130 to communicate with the user device 120 for the purpose of, for example, receiving tabular data, sending dashboards or portions thereof for display, and the like. Further, the network interface 440 allows the visual representation generator 130 to communicate with the data sources 140 for the purpose of retrieving tabular data.

It should be understood that the embodiments described herein are not limited to the specific architecture illustrated in FIG. 4, and other architectures may be equally used without departing from the scope of the disclosed embodiments.

It should be noted that various embodiments described herein are discussed with respect to columns of tabular data, but that other series of data may be equally utilized without departing from the disclosed embodiments. For example, data may be arranged primarily with respect to rows or other series of cells and, therefore, the disclosed embodiments may be applied to determine prediction values between rows as well as interest ranks of rows and row sets.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for generating visual representations of interesting plots of tabular data, comprising:

determining a plurality of prediction values for a plurality of column sets included in tabular data, wherein each column set includes at least one of the plurality of columns, wherein each prediction value is determined for a column set of the plurality of column sets using a prediction function selected from a plurality of prediction functions based on a column type of each column of the column set;

determining an interest rank for each column of the plurality of columns based on the plurality of prediction values;

determining an interest rank for each plot of a plurality of potential plots based on the plurality of prediction values and the interest rank of each of the plurality of columns, wherein each potential plot is a plot of one of the plurality of column sets; and generating a visual representation of at least one interesting plot, wherein the at least one interesting plot is selected from among the plurality of potential plots based on the plurality of interest ranks of the plurality of potential plots;

wherein determining the interest rank for each column of the plurality of columns further comprises:

creating a prediction graph based on the plurality of prediction values, wherein the prediction graph has a vertex set and an edge set, wherein the vertex set includes a list of the plurality of columns, wherein the edge set includes the plurality of prediction values; and applying a power iteration algorithm on the prediction graph.

2. The method of claim 1, wherein determining the plurality of prediction values for the plurality of column sets further comprises:

applying a classifier to features extracted from the tabular data; and selecting the prediction function to be applied to each column set of the plurality of column sets based on the classification for each of the two columns of the column set.

3. The method of claim 2, wherein the classifier is trained to classify each column into a column type.

4. The method of claim 2, wherein the features include at least one of: column names, column distribution features, string information features, and column relations.

5. A method for generating visual representations of interesting plots of tabular data, comprising:

determining a plurality of prediction values for a plurality of column sets included in tabular data, wherein each column set includes at least one of the plurality of columns, wherein each prediction value is determined for a column set of the plurality of column sets using a prediction function selected from a plurality of prediction functions based on a column type of each column of the column set;

determining an interest rank for each column of the plurality of columns based on the plurality of prediction values;

determining an interest rank for each plot of a plurality of potential plots based on the plurality of prediction values and the interest rank of each of the plurality of columns, wherein each potential plot is a plot of one of the plurality of column sets; and generating a visual representation of at least one interesting plot, wherein the at least one interesting plot is selected from among the plurality of potential plots based on the plurality of interest ranks of the plurality of potential plots;
wherein at least one of the plurality of prediction functions is asymmetrical.

6. The method of claim 5, wherein the prediction value determined by applying each asymmetrical prediction function is different for at least some inverse column sets of the plurality of column sets.

7. The method of claim 5, wherein the column type of each column of the plurality of column sets is either a measurement column including numerical values or a dimension column including data other than numerical values.

8. The method of claim 5, wherein the at least one column of each column set is a first column and a second column, wherein the first column has a first column type, wherein the second column has a second column type, further comprising:
  applying a first prediction function when the first column type is a dimension column and the second column type is a measurement column;
  applying a second prediction function when the first column type is a measurement column and the second column type is a dimension column;
  applying a third prediction function when each of the first column type and the second column type is a measurement column; and
  applying a fourth prediction function when each of the first column type and the second column type is a dimension column.

9. A non-transitory computer readable medium having stored thereon instructions for
  causing a processing circuitry to execute a process, the process comprising:
  determining a plurality of prediction values for a plurality of column sets included in tabular data, wherein each column set includes at least one of the plurality of columns, wherein each prediction value is determined for a column set of the plurality of column sets
  using a prediction function selected from a plurality of prediction functions based on a column type of each column of the column set;
  determining an interest rank for each column of the plurality of columns based on the plurality of prediction values;
  determining an interest rank for each plot of a plurality of potential plots based on the plurality of prediction values and the interest rank of each of the plurality of columns, wherein each potential plot is a plot of one of the plurality of column sets; and
  generating a visual representation of at least one interesting plot, wherein the at least one interesting plot is selected from among the plurality of potential plots based on the plurality of interest ranks of the plurality of potential plots;
  wherein at least one of the plurality of prediction functions is asymmetrical.

10. A system for generating visual representations of interesting plots of tabular data, comprising:
  a processing circuitry; and
  a memory, the memory containing instructions that, when executed by the processing circuitry, configure the system to:
  determine a plurality of prediction values for a plurality of column sets included in tabular data, wherein each column set includes at least one of the plurality of columns, wherein each prediction value is determined for a column set of the plurality of column sets
  using a prediction function selected from a plurality of prediction functions based on a column type of each column of the column set;
  determine an interest rank for each column of the plurality of columns based on the plurality of prediction values;
  determine an interest rank for each plot of a plurality of potential plots based on the plurality of prediction values and the interest rank of each of the plurality of columns, wherein each potential plot is a plot of one of the plurality of column sets; and
  generate a visual representation of at least one interesting plot, wherein the at least one interesting plot is selected from among the plurality of potential plots based on the plurality of interest ranks of the plurality of potential plots;
  wherein the system is further configured to:
  create a prediction graph based on the plurality of prediction values, wherein the prediction graph has a vertex set and an edge set, wherein the vertex set includes a list of the plurality of columns, wherein the edge set includes the plurality of prediction values; and
  apply a power iteration algorithm on the prediction graph.

11. The system of claim 10, wherein the system is further configured to:
  apply a classifier to features extracted from the tabular data; and
  select the prediction function to be applied to each column set of the plurality of column sets based on the classification for each of the two columns of the column set.

12. The system of claim 11, wherein the classifier is trained to classify each column into a column type.

13. The system of claim 11, wherein the features include at least one of: column names, column distribution features, string information features, and column relations.

14. A system for generating visual representations of interesting plots of tabular data, comprising:
  a processing circuitry; and
  a memory, the memory containing instructions that, when executed by the processing circuitry, configure the system to:
  determine a plurality of prediction values for a plurality of column sets included in tabular data, wherein each column set includes at least one of the plurality of columns, wherein each prediction value is determined for a column set of the plurality of column sets
  using a prediction function selected from a plurality of prediction functions based on a column type of each column of the column set;
  determine an interest rank for each column of the plurality of columns based on the plurality of prediction values;
  determine an interest rank for each plot of a plurality of potential plots based on the plurality of prediction values and the interest rank of each of the plurality of columns, wherein each potential plot is a plot of one of the plurality of column sets; and
  generate a visual representation of at least one interesting plot, wherein the at least one interesting plot is selected from among the plurality of potential plots based on the plurality of interest ranks of the plurality of potential plots;
  wherein at least one of the plurality of prediction functions is asymmetrical.

15. The system of claim 14, wherein the prediction value determined by applying each asymmetrical prediction function is different for at least some inverse column sets of the plurality of column sets.

16. The system of claim 14, wherein the column type of each column of the plurality of column sets is either a measurement column including numerical values or a dimension column including data other than numerical values.

17. The system of claim 14, wherein the at least one column of each column set is a first column and a second column, wherein the first column has a first column type, wherein the second column has a second column type, wherein the system is further configured to:
- apply a first prediction function when the first column type is a dimension column and the second column type is a measurement column;
- apply a second prediction function when the first column type is a measurement column and the second column type is a dimension column;
- apply a third prediction function when each of the first column type and the second column type is a measurement column; and
- apply a fourth prediction function when each of the first column type and the second column type is a dimension column.

* * * * *